United States Patent
Seetharaman et al.

(10) Patent No.: US 11,563,652 B2
(45) Date of Patent: Jan. 24, 2023

(54) METHOD, SYSTEM, AND DEVICE FOR ADAPTIVE DETERMINATION OF NETWORK SLICE CONFIGURATION AND RESOURCE REQUIREMENTS

(71) Applicant: Wipro Limited, Bangalore (IN)

(72) Inventors: Swaminathan Seetharaman, Chennai (IN); Krishna Moorthy Manoharan, Chennai (IN); Dhebeha Mj, Chennai (IN)

(73) Assignee: Wipro Limited, Bangalore (IN)

( * ) Notice: Subject to any disclaimer, the term of this patent is extended or adjusted under 35 U.S.C. 154(b) by 127 days.

(21) Appl. No.: 17/014,018

(22) Filed: Sep. 8, 2020

(65) Prior Publication Data

US 2022/0021590 A1  Jan. 20, 2022

(30) Foreign Application Priority Data

Jul. 14, 2020 (IN) .............................. 202041029931

(51) Int. Cl.
*H04L 41/5051* (2022.01)
*H04L 41/5025* (2022.01)
(Continued)

(52) U.S. Cl.
CPC ...... *H04L 41/5051* (2013.01); *H04L 41/0681* (2013.01); *H04L 41/0893* (2013.01); *H04L 41/5025* (2013.01); *H04L 41/5045* (2013.01)

(58) Field of Classification Search
CPC ............ H04L 41/5051; H04L 41/0681; H04L 41/0893; H04L 41/5025; H04L 41/5045
See application file for complete search history.

(56) References Cited

U.S. PATENT DOCUMENTS

2016/0353465 A1\* 12/2016 Vrzic ................ H04W 28/0247
2017/0245176 A1\*  8/2017 Murphy ................ H04L 41/145
(Continued)

OTHER PUBLICATIONS

3GPP TS 28.531 v16.5.0, 3rd Generation Partnership Project;Technical Specification Group Services and System Aspects; Management and orchestration; Provisioning (Release 16), 3GPP Mar. 2020, 71 pages.

(Continued)

*Primary Examiner* — Kamal B Divecha
*Assistant Examiner* — Sujana Khakural
(74) *Attorney, Agent, or Firm* — Finnegan, Henderson, Farabow, Garrett & Dunner, LLP

(57) ABSTRACT

A method and system for adaptive determination of network slice configuration and resource requirement is disclosed. The method includes creating a service requirement set based on a service request. The method further includes determining enhancements and adjustments to be done in the service requirement set based on a plurality of user entitlements corresponding to the user associated with the service request. The method further includes generating an updated service requirement set based on the enhancements and adjustments applied on the service requirement set. The method further includes determining a network slice template hierarchy based on the updated service requirement set. The method further includes determining a resource requirement corresponding to each of the plurality of network sub-nets based on the updated service requirement set, the plurality of user entitlements, and dynamic network context.

15 Claims, 8 Drawing Sheets

(51) Int. Cl.
   *H04L 41/5041*   (2022.01)
   *H04L 41/0681*   (2022.01)
   *H04L 41/0893*   (2022.01)

(56) References Cited

U.S. PATENT DOCUMENTS

| | | | | |
|---|---|---|---|---|
| 2019/0149998 | A1* | 5/2019 | Yang | H04W 16/04 |
| | | | | 370/328 |
| 2019/0174322 | A1* | 6/2019 | Deviprasad | H04W 16/10 |
| 2019/0273635 | A1* | 9/2019 | McNamee | H04L 12/1407 |
| 2019/0319859 | A1* | 10/2019 | Casey | H04L 41/5041 |
| 2019/0327317 | A1* | 10/2019 | Lu | H04L 67/20 |
| 2019/0349792 | A1* | 11/2019 | Xu | H04L 41/042 |
| 2020/0044943 | A1* | 2/2020 | Bor-Yaliniz | H04L 41/5025 |
| 2020/0367145 | A1* | 11/2020 | Zhang | H04W 74/006 |

OTHER PUBLICATIONS

3GPP TS 28.541 v16.4.1, 3rd Generation Partnership Project;Technical Specification Group Services and System Aspects; Management and orchestration; 5G Network Resource Model (NRM); Stage 2 and stage 3 (Release 16), 3GPP Mar. 2020, 324 pages.

* cited by examiner

| Class of subscriber 302 | Service class 304 | Service priority (1=highest) 306 | Usage entitlement 308 | User Entitlement-Factor 310 |
|---|---|---|---|---|
| Premium | Platinum | 1 | Unlimited | 0.5 |
| Premium | Gold | 1 | Limited | 0.45 |
| ... | | | | |
| kLaw | Platinum | 1 | Unlimited | 0.6 |
| ... | | | | |
| Normal | Bronze | 3 | Unlimited | 0.05 |
| ... | | | | |

METHOD, SYSTEM, AND DEVICE FOR ADAPTIVE DETERMINATION OF NETWORK SLICE CONFIGURATION AND RESOURCE REQUIREMENTS

TECHNICAL FIELD

This disclosure relates generally to network slicing, and more particularly to method and system for adaptive determination of network slice configuration and resource requirement.

BACKGROUND

Network slicing refers to the partitioning of a network into several virtual networks each of which is configured and optimized for a particular application/service. Moreover, network slicing is performed statically or dynamically based on need and capability of the network. Moreover, dynamic network slicing may be more suitable in networks that may require catering to high throughput, low latency, high device density and diverse set of service types. Conventionally, one of a key aspects of dynamic network slicing is interpretation of a service request and subsequently determining most suitable slice configuration and associated resources for fulfillment of received service request. In addition, the conventional approaches may determine resource budget for different network segments (or sub-nets) of an end-to-end network slice using pre-defined proportions.

For example, delay-budget (latency) for each slice sub-net of a network slice is determined using provisioned ratios, for e.g., 30%-30%-40% for Radio Access Network (RAN), Transport and Core slice sub-nets. If the end-to-end latency requirement for the network slice is, say, 40 milliseconds, then the latency may be split as 12-12-16 milliseconds for RAN, Transport and Core slice sub-nets. However, the conventional approach may be agnostic of network context leading to compromised delivered service quality, improper allocation of network resources, or refusal of the service request. Therefore, a mechanism is needed for adaptive determination of slice topology and resource allocation for service delivery as per user entitlement and network context.

SUMMARY

In an embodiment, a method for adaptive determination of network slice configuration and resource requirement is disclosed. In one embodiment, the method may include creating a service requirement set based on a service request. The service requirement set comprises service characteristics, service performance requirements, and service dimensions associated with the service request. The method may further include determining enhancements and adjustments to be done in the service requirement set based on a plurality of user entitlements corresponding to the user associated with the service request. The plurality of user entitlements comprises a class of subscriber, a service category, maximum usage limit, and a service priority. The method may further include generating an updated service requirement set based on the enhancements and adjustments applied on the service requirement set. The method may further include determining a network slice template hierarchy based on the updated service requirement set. The network slice template hierarchy comprises a plurality of network sub-nets. The method may further include determining a resource requirement corresponding to each of the plurality of network sub-nets based on the updated service requirement set, the plurality of user entitlements, and dynamic network context.

In another embodiment, a system for adaptive determination of network slice configuration and resource requirement is disclosed. The system includes a processor and a memory communicatively coupled to the processor, wherein the memory stores processor instructions, which, on execution, causes the processor to create a service requirement set based on a service request. The service requirement set comprises service characteristics, service performance requirements, and service dimensions associated with the service request. The processor instructions further cause the processor to determine enhancements and adjustments to be done in the service requirement set based on a plurality of user entitlements corresponding to the user associated with the service request. The plurality of user entitlements comprises a class of subscriber, a service category, maximum usage limit, and a service priority. The processor instructions further cause the processor to generate an updated service requirement set based on the enhancements and adjustments applied on the service requirement set. The processor instructions further cause the processor to determine a network slice template hierarchy based on the updated service requirement set. The network slice template hierarchy comprises a plurality of network sub-nets. The processor instructions further cause the processor to determine a resource requirement corresponding to each of the plurality of network sub-nets based on the updated service requirement set, the plurality of user entitlements, and dynamic network context.

In yet another embodiment, a non-transitory computer-readable storage medium is disclosed. The non-transitory computer-readable storage medium has instructions stored thereon, a set of computer-executable instructions causing a computer comprising one or more processors to perform steps comprising creating a service requirement set based on a service request, wherein the service requirement set comprises service characteristics, service performance requirements, and service dimensions associated with the service request; determining enhancements and adjustments to be done in the service requirement set based on a plurality of user entitlements corresponding to the user associated with the service request, wherein the plurality of user entitlements comprises a class of subscriber, a service category, maximum usage limit, and a service priority; generating an updated service requirement set based on the enhancements and adjustments applied on the service requirement set; determining a network slice template hierarchy based on the updated service requirement set, and wherein the network slice template hierarchy comprises a plurality of network sub-nets; and determining a resource requirement corresponding to each of the plurality of network sub-nets based on the updated service requirement set, the plurality of user entitlements, and dynamic network context.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
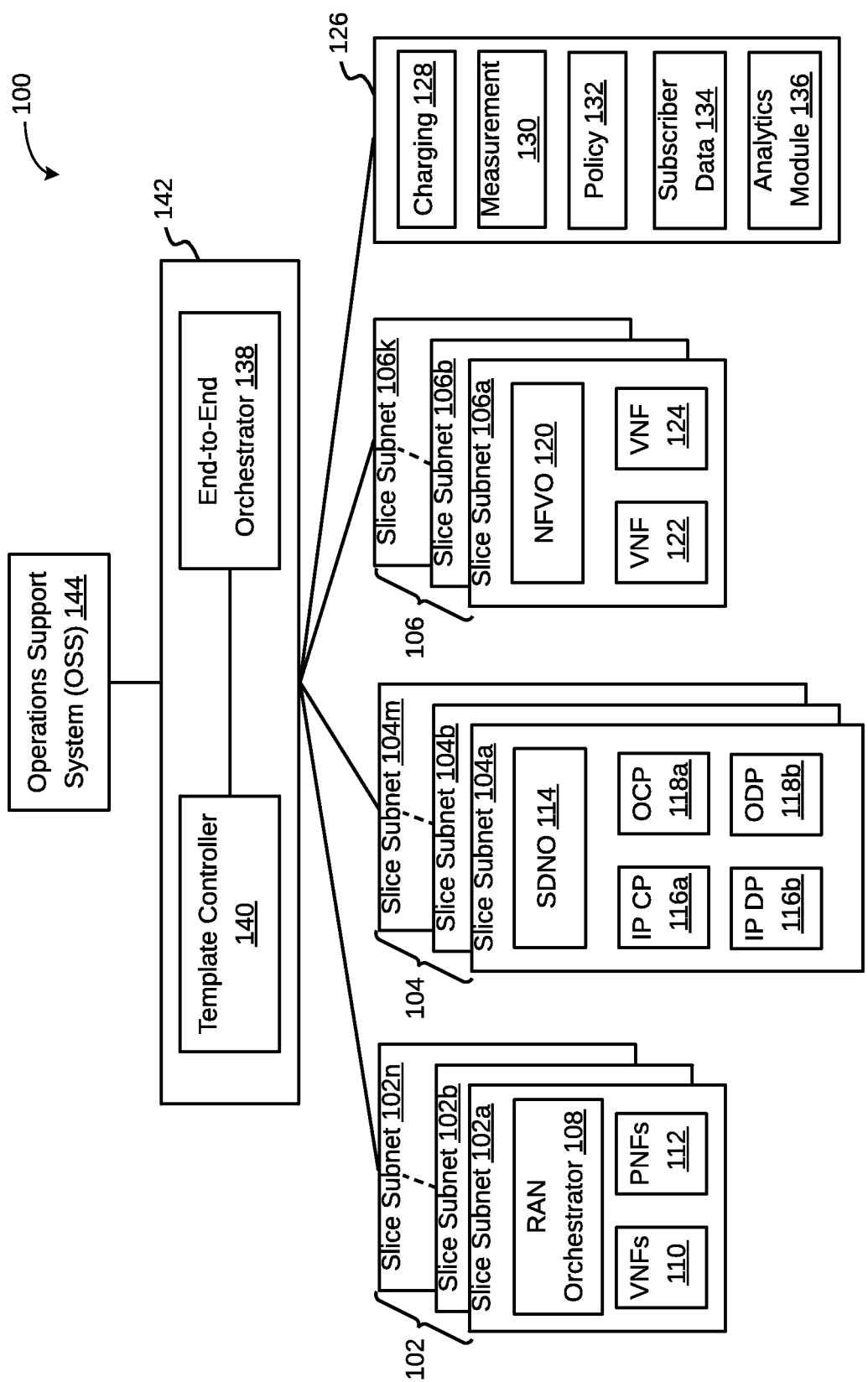
FIG. 1 represents a block diagram of a system for adaptive determination of network slice configuration and resource requirement, in accordance with an embodiment.

Referring now to FIG. 1, a block diagram of a system 100 for adaptive determination of network slice configuration and resource requirement is illustrated, in accordance with an embodiment. The system 100 displays an end-to-end view of various components in a network that is configured for network slicing. The system 100 depicts a plurality of network segments (also called subnets), for example, a Radio Access Network (RAN) network segment 102, a transport/backhaul network segment 104, and a core network 106. Each of the plurality of network segments include a plurality of slice subnet instances which are also called slice subnets. By way of an example, the RAN network segment 102 includes slice subnets 102a to 102n. By way of another example, the transport/backhaul network segment 104 includes slice subnets 104a to 104m. By way of yet another example, core network 106 includes slice subnets 106a to 106k.

Each of the plurality of network segments may include network functions and interconnections. Further, each of the plurality of network segments may also include a domain controller or orchestrator. The RAN network segment 102 may include a RAN Orchestrator 108 and a plurality of Virtual Network Functions (VNFs) 110 and a plurality of Physical Network Functions (PNFs) 112. The VNFs 110 and PNFs 112 may be specific to a RAN slice subnet (102a to 102n) or may be shared across more than one RAN slice subnets 102a to 102n in the RAN network segment 102. The transport/backhaul network segment 104 may include a Software Defined Network Orchestrator (SDNO) 114, IP Control Plane (IP CP), IP Data Plane (IP DP), Optical Control Plane (OCP) and Optical Data Plane (ODP). The IP CP, IP DP, OCP and ODP may be specific to a transport slice subnet instance within 104a to 104m or may be shared across more than one transport slice subnet 104a to 104m within the transport/backhaul network segment. For example, in FIGS. 1, 116a and 118a refer to an IP Control Plane (IP CP) and an Optical Control Plane (OCP) respectively that are part of slice subnet instance 104a. 116b and 118b refer to an IP Data Plane (IP DP) and an Optical Data Plane (ODP) respectively that are part of Slice subnet instance 104b. The core network segment 106 may include a Network functions virtualization Orchestrator (NFVO) 120, VNFs, for example, VNF 122, VNF 124, and their interconnections.

In an embodiment, for each of the plurality of network segments, a domain controller or orchestrator may be common across a corresponding plurality of slice subnets. By way of an example, the RAN orchestrator 202 may be common across the slice subnets 102a to 102n. In other words, the domain controller or orchestrator may be slice-agnostic. Alternatively, a separate domain controller or orchestrator may exist for each slice subnet depending on a deployment scenario.

Common functions 126 across each of the plurality of network segments, are slice-agnostic functions and are thus depicted separately. The common functions, for example, may include, functions for charging 128, measurement 130, policy 132, subscriber data (and its management) 134, and an analytics module 136. The common functions 126 may be realized as being part of a separate network segment that includes one slice subnet, which is shared across all the network slices.

The system 100 may further include an end-to-end orchestrator 138 that may perform service orchestration, slice orchestration, and resource orchestration functions. The end-to-end orchestrator 138 may further be communicatively coupled to a template controller 140 within an orchestration plane 142. The template controller 140 is configured to maintain network slice templates for slice orchestration. The end-to-end orchestrator 138 is further explained in detail in conjunction with FIG. 2. The interface between the end-to-end orchestrator 138 and the template controller 140 may be a REpresentational State Transfer (REST) interface which is secured using https, for example, or the interface may be a proprietary message-based interface.

The end-to-end orchestrator 138 and the template controller 140 may be communicatively coupled to each of the plurality of network segments through a REST interface, netconf/yang-based interface (running over Transport Layer Security (TLS) or Stream Control Transmission Protocol (SCTP) or Transmission Control Protocol (TCP) over Internet Protocol (IP), or any proprietary interface for configuration, notification/reporting, and monitoring data transfer from the plurality of network segments to the end-to-end orchestrator 138.

The system 100 may further include an Operations Support System (OSS) 144, which may include suitable logic, circuitry, interfaces, and/or code. The OSS 144 is communicatively coupled to the end-to-end orchestrator 138 and the template controller 140 through an interface, which may be a REST interface (typically secure) or may use well-known protocols such as Simple Network Management Protocol (SNMP) or Netconf. The interface may also be proprietary.

Figure 2:
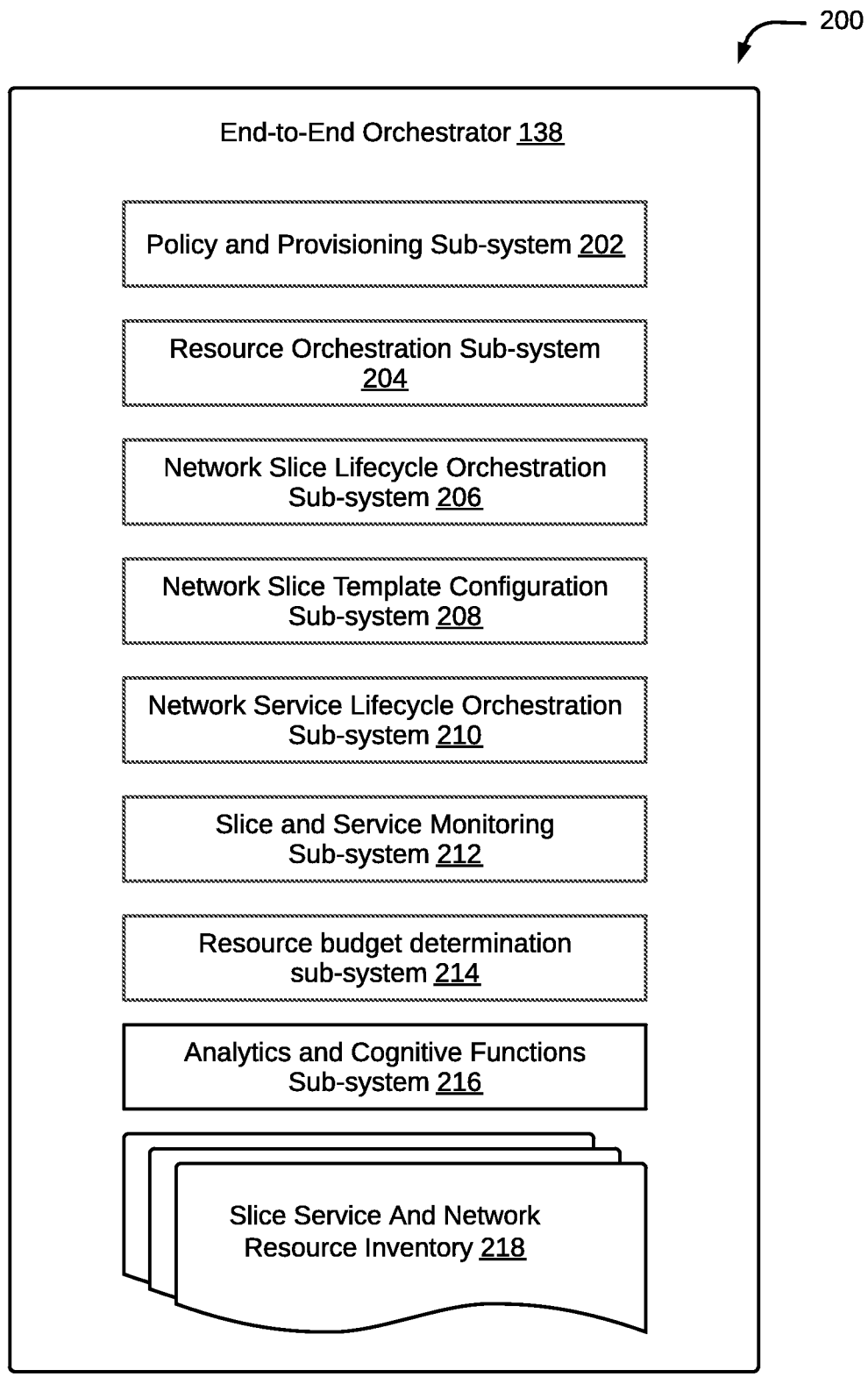
FIG. 2 illustrates a functional block diagram of various modules within an end-to-end orchestrator for adaptive determination of network slice configuration and resource requirement, in accordance with some embodiment.

Referring now to FIG. 2, a block diagram of various modules within the end-to-end orchestrator 138 configured for adaptive determination of network slice configuration and resource requirement is illustrated, in accordance with an embodiment. The end-to-end orchestrator 138 includes a policy and provisioning sub-system (POL-PROV-SS) 202, a resource orchestration sub-system (RES-ORCH-SS) 204, a network slice lifecycle orchestration sub-system (NTW-SL-ORCH-SS) 206, a network slice template configuration sub-system (NEW-ST-CONF-SS) 208, a network service lifecycle orchestration sub-system (NTW-SERV-ORCH-SS) 210, a slice and service monitoring sub-system (SL-SRV-MON-SS) 212, a resource budget determination sub-system (RES-BUD-SS) 214, an analytics and cognitive functions sub-system (AN-COF-SS) 216, and slice, service, and network resource inventory (SL-SRV-RES-INV) 218.

The POL-PROV-SS 202 may be configured to receive all policy and other provisioned inputs and may then send relevant aspects to relevant sub-systems in the end-to-end orchestrator 138. The POL-PROV-SS 202 may also receive request for service or slice creation, or modification from the OSS 144. In an embodiment, the POL-PROV-SS 202 may receive request for service or slice creation, or modification from slice consumer. Thereafter, the POL-PROV-SS 202 may pass on the relevant aspects and the service request to relevant sub-systems in the end-to-end orchestrator 138. By way of an example, in case of the service request, the POL-PROV-SS 202 may send the relevant aspects and a request to the NTW-SERV-ORCH-SS 210 for creation, or modification of service.

By way of another example, in case of slice request, the POL-PROV-SS 202 may send the relevant aspects and a request to the NTW-SL-ORCH-SS 206 for creation, or modification of slice. In addition to its existing functions, the POL-PROV-SS 202 may obtain inputs corresponding to a user entitlement. In an embodiment, the user entitlement inputs may correspond to the plurality of user entitlements. The user entitlement inputs may include, but are not limited to, a class of subscriber, a service category (also referred as a service class), maximum usage limit, and a service priority. In an embodiment, the user entitlement inputs may be provided by a requestor of the service or the slice for creation or modification. In addition, the user entitlement inputs may be captured through regulatory or network policy provisioning, or it may be queried by the POL-PROV-SS 202 from the OSS 144.

The RES-ORCH-SS 204 may be responsible for performing resource orchestration for the service request or the slice request. In addition to its existing functions, the RES-ORCH-SS 204 may provide necessary inputs to the RES-BUD-SS 214 for determining appropriate resource budgets. Moreover, the RES-ORCH-SS 204 may provide necessary inputs to the NTW-SL-ORCH-SS 206 for suitably adapting a service requirement set (SRS) based on the user entitlement inputs received.

The NTW-SL-ORCH-SS 206 may be responsible for all orchestration functions associated with a network slice. The orchestration functions may include, but is not limited to, instantiation of a new network slice, scaling up/down, healing and making modifications, and terminating/decommissioning a network slice. As will be appreciated, the NTW-SL-ORCH-SS 206 may work close with the NEW-ST-CONF-SS 208 in order to instantiate or reuse an appropriate network slice instance. In addition to its existing functions, the NTW-SL-ORCH-SS 206 may determine appropriate enhancements and adaptations to be done to the SRS based on the user entitlement inputs before initiating a network slice allocation action. The NTW-SL-ORCH-SS 206 may also determine appropriate adaptations to be done to the SRS based on the user entitlement inputs received, or dynamic change in network context. Moreover, the NTW-SL-ORCH-SS 206 may determine enhancement and adjustments to be done to parameter values, rules, and thresholds for determining updates to be done to the SRS, based on self-learning.

The NEW-ST-CONF-SS 208 may be responsible for determining a suitable network slice instance for fulfilling the service request upon receiving a trigger from the NTW-SL-ORCH-SS 206. The determination of the suitable network slice instance by the NEW-ST-CONF-SS 208 may include providing details of an existing network slice instance that may be reused, creating a new network slice instance that comprises of details of existing network slice subnet instances that can be reused (as-is or with minor modifications), and/or details of new network slice subnet instance(s) that needs to be created. In addition to its existing functions, the NEW-ST-CONF-SS 208 may trigger the RES-BUD-SS 214 for determining resource budgets for various network segments/sub-nets when the new network slice instance needs to be created. Also, the NEW-ST-CONF-SS 208 may provide updated network slice instance allocation information when triggered by the NTW-SL-ORCH-SS 206 with an adapted SRS (i.e., the updated SRS).

The NTW-SERV-ORCH-SS 210 may be responsible for orchestration of a network service including service instantiation on the network slice provided by the NTW-SL-ORCH-SS 206 in the presence of network slicing. Also, the NTW-SERV-ORCH-SS 210 may be responsible for scaling up/down resources and limits for access (also referred as maximum usage limit), healing, modification, and termination of the service request. In addition to its existing functions, the NTW-SERV-ORCH-SS 210 may provide updates to the NTW-SL-ORCH-SS 206 on revision of the user entitlement inputs.

The SL-SRV-MON-SS 212 may be responsible for monitoring adherence levels of the network slice (end-to-end as well as network segment/sub-net level), service target KPIs, and requirements. The SL-SRV-MON-SS 212 may report any fault of performance issues in the network slice or the services to the NTW-SL-ORCH-SS 206 or NTW-SERV-ORCH-SS 210 respectively. In addition to its existing functions, the SL-SRV-MON-SS 212 may monitor adherence levels of the resource budgets allocated to various network segments/sub-nets and may also provide correlation information about resource occupancy levels.

The RES-BUD-SS 214 may be configured to determine appropriate resource budgets for every network segment/sub-net in the network slice based on the SRS and dynamic network conditions. Examples of the resource budgets may include, but is not limited to, a latency and a throughput budget for each network segment/sub-net, and access type. The RES-BUD-SS 214 may adapt the resource budgets based on the trigger received from the NTW-ST-CONF-SS 208. The trigger received from the NTW-ST-CONF-SS 208 may include the adapted SRS, and additional inputs on fault/performance issues in one or more network segments/sub-nets. Moreover, the RES-BUD-SS 214 may adapt thresholds and parameter weights that may be used in determining the resource budgets with relevant inputs from the SL-SRV-MON-SS 212 and the AN-COF-SS 216.

The AN-COF-SS 216 may be responsible for performing all analytics and cognitive functions related to service and slice orchestration. Moreover, the AN-COF-SS 216 may be invoked by the relevant sub-system for performing necessary prediction/detection. In an embodiment, the AN-COF-SS 216 may be invoked by the NTW-SL-ORCH-SS 206, the NTW-ST-CONF-SS 208, the SL-SRV-MON-SS 212, or the NTW-SERV-ORCH-SS 210. Examples of prediction/detection performed by the AN-COF-SS 216 may include, but is not limited to, resource occupancy trend in a network slice, and a root cause analysis in a network segment failure. In addition to its existing functions, the AN-COF-SS 216 may provide relevant inputs to the RES-BUD-SS 214 for adjustment of USER-ENTLMENT-FACTOR-TABLE based on monitored/predicted performance of the network slice and service. An exemplary USER-ENTLMENT-FACTOR-TABLE may be represented as illustrated in conjunction FIG. 3. The performance of the network slice and service may be monitored/predicted by the AN-COF-SS 216 based on relevant inputs provided by the SL-SRV-MON-SS 212. The AN-COF-SS 216 may also provide relevant inputs based on capability of the network segment/sub-net to the RES-BUD-SS 214 during determination of the resource budgets for each network segments of the network slice. Moreover, the AN-COF-SS 216 may provide the relevant inputs to USER-ENTLMENT-FACTOR for adjusting rules and thresholds in order to determine updates to be done in the SRS based on the user entitlement inputs.

The SL-SRV-RES-INV 218 may correspond to a component that may contain details of network slice templates and active network slice instances, slice sub-net templates and active network slice instances, the SRS, resources allocated to each slice and slice sub-net, active services, and details of the slice to which it is mapped to. In addition to existing information, the SL-SRV-RES-INV 218 component may store the USER-ENTLMENT-FACTOR-TABLE, details of parameter values and thresholds required for determination of updates to the SRS and determination of resource budgets that may be determined for various network segments/sub-nets. Moreover, the SRS may be updated based on the user entitlement input.

Figure 3:
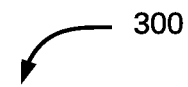
FIG. 3 is an exemplary representation of a user entitlement factor table depicting a plurality of user entitlements, in accordance with the embodiment.

Referring now to FIG. 3, an exemplary representation of a user entitlement factor table 300 depicting a plurality of user entitlements is represented, in accordance with the embodiment. The user entitlement factor table 300 may represent the plurality of user entitlements. The plurality of user entitlements may include, but is not limited to, a class of subscriber, a service category, maximum usage limit, and a service priority. The user entitlement factor table 300 includes a class of subscriber 302, a service class 304, a service priority 306, a usage entitlement 308, and a user entitlement factor 310. For example, the class of subscribers 302 may include, but is not limited to a premium user, a normal user, a best-effort user, a Platinum/Gold/Silver/Bronze user, a premium enterprise user, a normal enterprise user, a premium residential user, and a normal user. The service class 304 may include, but is not limited to, platinum, gold, silver, and bronze. In an embodiment, the service class 304 may correspond to the service category. The service priority 306 may correspond to a numeric value assigned to the user based on service quality provided to the user. By way of an example, the service priority having the numeric value '1' may assigned to the user with highest service quality provided, while the numeric value '5' may be assigned to the user having lowest service quality provided. Examples of the services which have the highest service priority may include, but is not limited to emergency services, and regulatory services. Examples of services which have the second highest service priority may include, but is not limited to services having the most stringent performance requirements. The usage entitlement 308 may include limited and unlimited access to services provided by network service provider. In an embodiment, the usage entitlement 308 may correspond to the maximum usage limit. Examples of the maximum usage limit may include, but is not limited to, daily limit on volume of data and number of sessions. The user entitlement factor 310 may be assigned to the user based on the plurality of user entitlements. Moreover, the user entitlement factor 310 may be determined in order updates that needs to be done in the service requirement set.

Figure 4:
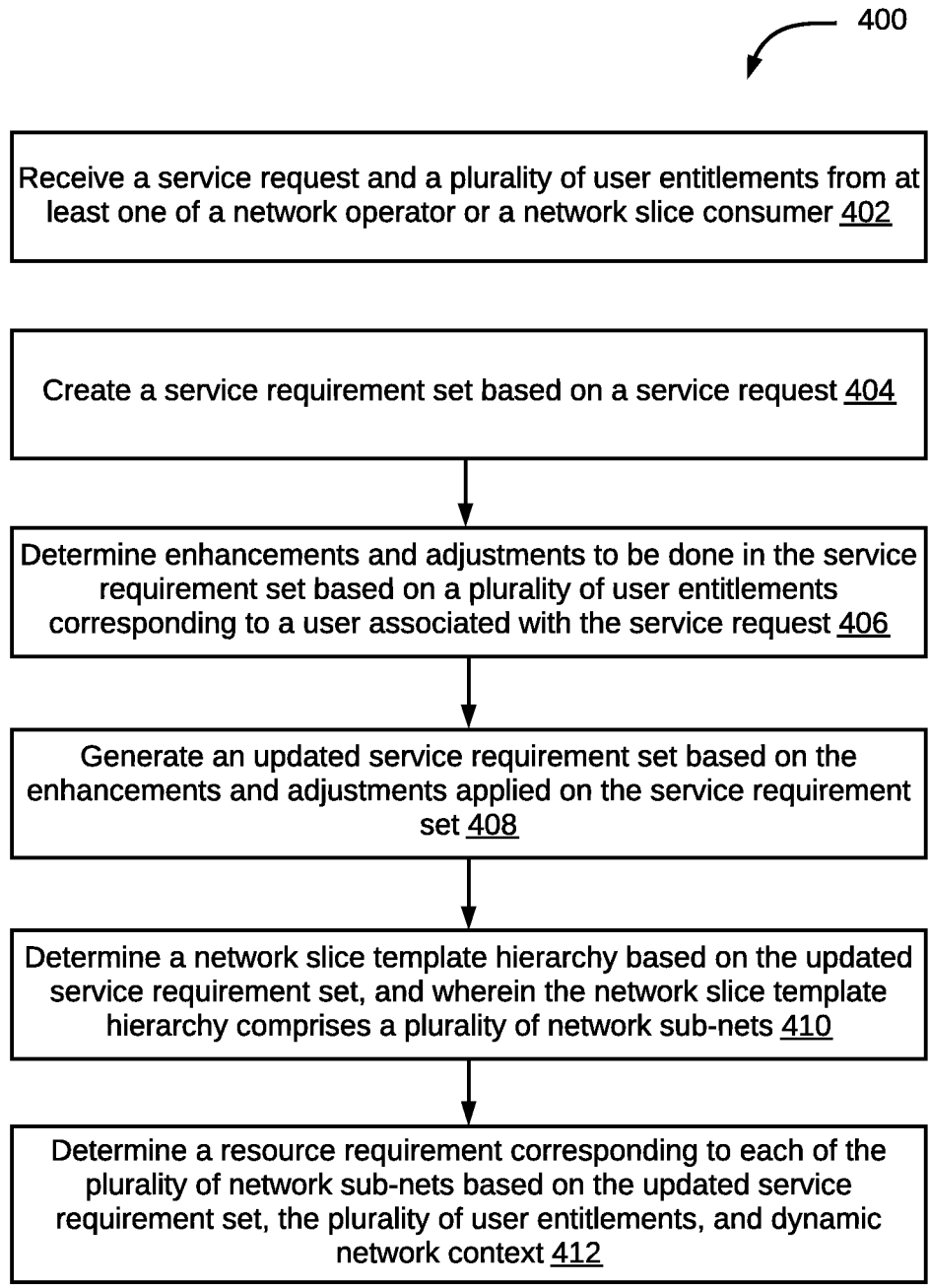
FIG. 4 illustrates a flowchart of a method for adaptive determination of network slice configuration and resource requirement, in accordance with an embodiment.

Referring now to FIG. 4, a flowchart of a method for adaptive determination of network slice configuration and resource requirement is illustrated, in accordance with an embodiment. At step 402, a service request and a plurality of user entitlements may be received from at least one of a network operator or a network slice consumer. The service request received may be associated with one of a creation, a reuse and a modification of at least one of a plurality of network slice instances. In addition, the service request may comprise service characteristics, service performance requirements, and service dimensions associated with the service request. Moreover, the service request may be received in order to instantiate a new service. The service request received from at least one of the network operators or the network slice consumer may be received via the Operations Support System (OSS) or a service request portal respectively. On receiving the service request, the plurality of user entitlement may be fetched. The plurality of user entitlements may include information about user entitlement. In an embodiment, the plurality of user entitlements may comprise the class of subscriber, the service category, maximum usage limit, and the service priority.

For example, the class of subscriber may include, but is not limited to the premium user, the normal user, the best-effort user, the Platinum/Gold/Silver/Bronze user, the premium enterprise user, the normal enterprise user, the premium residential user, and the normal user. The service category (also referred as the service class) may include, but is not limited to platinum, gold, silver, and bronze. The maximum usage limit (also referred as the usage entitlement) may include limited and unlimited access to services provided by network service provider. Examples of the maximum usage limit may include, but is not limited to, daily limit on volume of data and number of sessions. The service priority may include, but is not limited to priority associated with emergency services, regulatory services, normal services and high-priority services. In an embodiment, the plurality of service request may be obtained by the POL-PROV-SS 202 based on requesting made to the OSS 144. In another embodiment, the plurality of user entitlements may be received along with the service request by the POL-PROV-SS 202. Moreover, the plurality of user entitlement and the service request may be stored locally in the SL-SRV-RES-INV 218.

At step 404, a service requirement set may be created based on the service request. The service requirement set may comprise service characteristics, service performance requirements, and service dimensions associated with the service request. In an embodiment the service characteristics, the service performance requirements, and the service dimensions may be determined by the NTW-SL-ORCH-SS 206. At step 406, enhancement and adjustments that needs to be done in the service requirement set may be determined. The enhancement and adjustments may be determined based on the plurality of user entitlements corresponding to the user associated with the service request. In an embodiment, relevant attributes may be determined corresponding to the service characteristics, the service performance requirements, and the service dimensions that needs to be updated in the service requirement set. The determination of the relevant attributes corresponding to the service characteristics, the service performance requirements, and the service dimensions is further explained in conjunction to FIG. 5. In an embodiment, the updated service requirement set may be formed by the NTW-SL-ORCH-SS 206.

At step 408, the updated service requirement set may be generated. The updated service requirement set may be generated based on the enhancements and adjustments applied on the service requirement set. The NTW-SL-ORCH-SS 206 may trigger the NEW-ST-CONF-SS 208 with the updated service requirement set in order to allocate a suitable network slice instance on which the new service may be instantiated. At step 410, a network slice template hierarchy may be determined based on the updated service requirement set. The network slice template hierarchy may also be referred as the suitable network slice instance. In addition, the network slice template hierarchy may comprise of a plurality of network sub-nets. The determination of the network slice template hierarchy is further explained in detail in conjunction to FIG. 6.

In an embodiment, the NEW-ST-CONF-SS 208 may request the template controller 140 (represented in FIG. 1) to determine the network slice template hierarchy. The NEW-ST-CONF-SS 208 may request the template controller 140 to determine the network slice template hierarchy based on the relevant attributes (also referred as relevant information) in the updated service requirement set. It should be noted that, the template controller 140 may determine the network slice template hierarchy based on an existing mechanism as described in prior-art. Thereafter, on receiving the network slice template hierarchy from the template controller 140, the NEW-ST-CONF-SS 208 may determine whether an existing network slice instance may be reused or not. It should be noted that, the determination of the reuse of the network slice instance may be done based on an existing mechanism as described in prior-art.

At step 412, a resource requirement may be determined corresponding to each of the plurality of network sub-net. Moreover, the resource requirement may be determined based on the updated service requirement set, the plurality of user entitlements, and dynamic network context. The resource requirement may also be referred as resource budget. As will be appreciated the plurality of sub-nets may be part of the network slice template hierarchy provided by the template controller 140. In an embodiment, the RES-BUD-SS 214, may determine the resource budget corresponding to to each of the plurality of network sub-net based on the trigger received from the NEW-ST-CONF-SS 208. In an embodiment, the network sub-nets may also be referred as the network segments.

Figure 5:
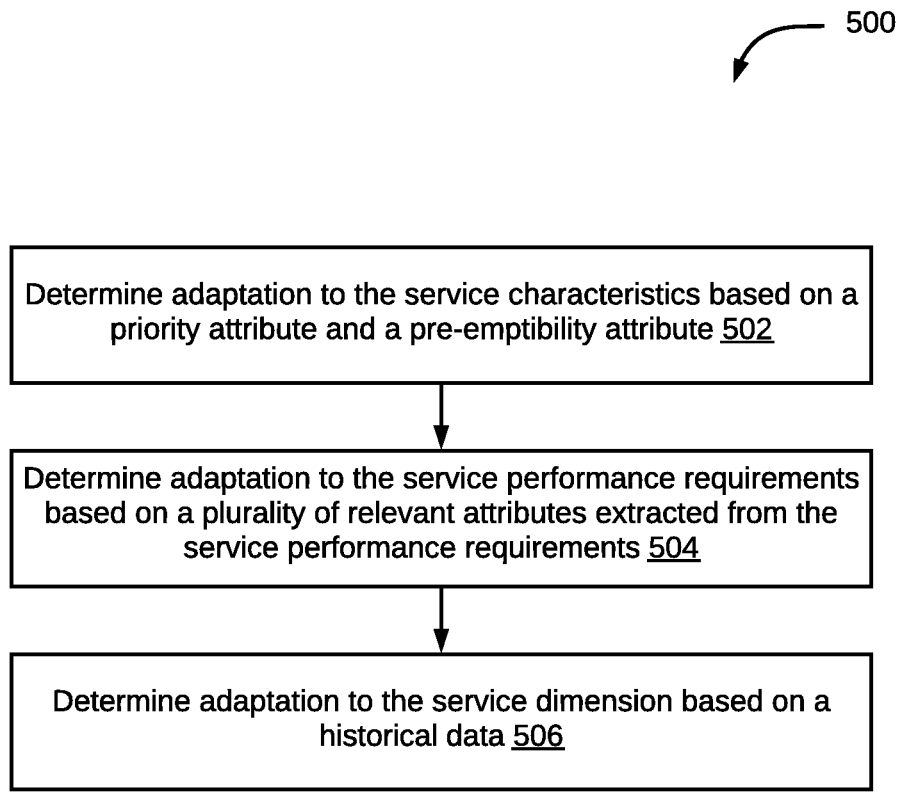
FIG. 5 illustrates a flowchart of a method of determining enhancement and adjustments to be done in the service requirement set based on the plurality of user entitlements, in accordance with an embodiment.

Referring now to FIG. 5, a flowchart of a method of determining enhancement and adjustments to be done in the service requirement set based on the plurality of user entitlements is illustrated, in accordance with an embodiment. At step 502, adaptation to the service characteristics may be determined based on a priority attribute and a pre-emptibility attribute. In an embodiment, the priority attribute may be determined based on a weighted average of the class of subscriber and the service priority. In addition, the pre-emptibility attribute may be determined based on an allowance of other services to pre-empt the service request, and a capability associated with the service request to pre-empt other services. The other services that may pre-empt the service request based on the allowance may be of same or higher priority and may correspond to same or different users. A value associated with the allowance (also referred as allowance attribute) may be determined based on the service category, the service priority, the class of subscriber, and a network or regulatory policy. By way of an example, the service request that may comprise emergency services may not be pre-empted at all by any other services. By way of another example, the service request comprising a basic communication service of any priority that may not be pre-empted by any other services except regulatory or emergency services.

Moreover, the service request may have the capability to pre-empt other services of same or lower priority that may correspond to same or different users. A value associated with the capability (also referred to as capability attribute) may be determined based on the service category, the service priority, the class of subscriber, and the network or regulatory policy. By way of an example, the service request comprising an emergency service may pre-empt all other services. By way of another example, the service request comprising a regulatory service i.e., the service request that may be used by law enforcement agencies may pre-empt all other services except emergency services. By way of yet another example, a service request from a certain class of subscriber, for example, a platinum user, may pre-empt all other services of same or different users of same or lower priority except emergency services. The determined adaptation corresponding to the service characteristics may be stored as updated service characteristics (UPD-SRV-CHAR).

At step 504, the adaptations to the service performance requirements may be determined based on plurality of user entitlements. The adaptations may be done to a plurality of relevant attributes extracted from the service performance requirements. The plurality of relevant attributes may comprise at least one of reliability and availability. In an embodiment, the adaptations to the service performance requirements may be determined based on an equation (1) represented below:

$$ADJ\text{-}ATTRIB\text{-}VALUE = (ATTRIB\text{-}VALUE) + (ATTRIB\text{-}VALUE * USER\text{-}ENTLMENT\text{-}FACTOR) \quad (1)$$

In the equation (1), the ADJ-ATTRIB-VALUE may represent an attribute value that may need to be adjusted corresponding to the service performance requirement. The ATTRIB-VALUE may represent an original attribute value corresponding to the service performance requirement. The USER-ENTLMENT-FACTOR may represent a value of user entitlement factor corresponding to the user. In an embodiment, the value of the USER-ENTLMENT-FACTOR may be determined from the USER-ENTLMENT-FACTOR-TABLE (as represented in FIG. 3). The determined adaptation corresponding to the service performance requirements may be stored as updated service performance requirement, i.e., UPD-SRV-PERF-REQ.

At step 506, adaptation to the service dimensions may be determined based on a historical data. The historical data includes information about a service loss, a service deterioration, and a service quality deterioration in proportion to the plurality of user entitlements. In an embodiment, the service loss or the service deterioration that may occur when the user temporarily goes out of coverage at the edge of certain geographical boundaries that may be identified based on the historical data. On identifying the service loss or the service deterioration a coverage factor and a mobility factor may be extended in proportion to the plurality of user entitlements. By way of an example, the platinum user (example of the class of subscriber) may have a wider area for same service as compared to a gold category user. In another embodiment, the service quality deterioration may occur when the maximum usage limits may be reached. In addition, the service quality deterioration may be identified based on historical data. On identifying the service quality deterioration, the maximum usage limit may be increased in proportion to the user entitlements. By way of an example, a premium pay-per-use user may get a higher limit as compared to that of a flat rate normal user. The determined adaptation corresponding to the service dimensions may be stored as updated service dimensions, i.e., UPD-SRV-DIM.

Figure 6:
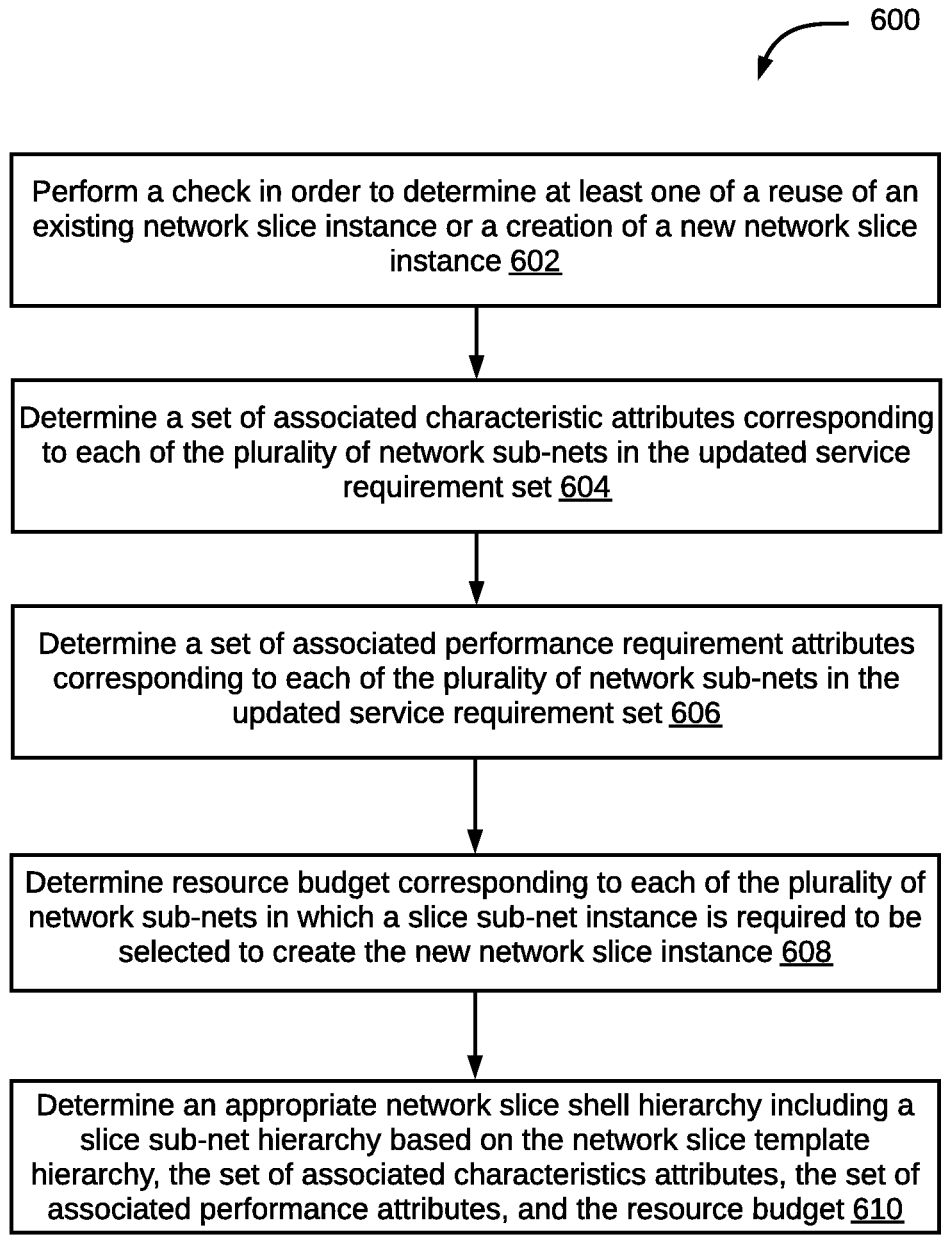
FIG. 6 illustrates a flowchart of a method for determining an appropriate network slice shell hierarchy including a slice sub-net hierarchy, in accordance with an embodiment.

Referring now to FIG. 6, a flowchart of a method for determining an appropriate network slice shell hierarchy including a slice sub-net hierarchy is illustrated, in accordance with an embodiment. At step 602, a check may be performed in order to determine at least one of a reuse of the existing network slice instance or the creation of the new network slice instance. Based on the check performed, on determining a need to create a new network slice instance, at step 604, a set of associated characteristic attributes may be determined corresponding to each of the plurality of network sub-nets in the updated service requirement set. The set of associated characteristic attributes may be determined based on the dynamic network context, and a type, a characteristics, and constraints associated with each of the plurality of network sub-nets.

In an embodiment, the RES-BUD-SS 214 may determine the plurality of network sub-nets for each subnet type based on relevant attributes associated with the service characteristic stored in the UPD-SRV-CHAR (of the updated service requirement set). The relevant attributes associated with the service characteristic may correspond to the set of associated characteristic attributes. Example of each subnet type may include, but is not limited to, cellular, Wi-Fi, unlicensed access for RAN sub-net, dedicated physical/logical resources or shared physical/logical resources for core and transport sub-net, and backhaul types for transport sub-net. In addition, the RES-BUD-SS 214 may also determine characteristics of the slice subnets and any constraints where resource budgets may need to be specified. Thereafter, the RES-BUD-SS 214 may form a slice sub-net characteristic i.e., a SLICE-SUB-CHAR. Moreover, the RES-BUD-SS 214 may also consider the dynamic network context in order to determine the SLICE-SUB-CHAR.

In an embodiment, the determination of the SLICE-SUB-CHAR for each subnet type in which a slice sub-net instance should be allocated may be done based on one of the following examples. By way of an example, an access type characteristic in the SLICE-SUB-CHAR for an access sub-net may include Wi-Fi, when the updated service requirement set does not contain any restriction on radio access type, and mobility requirement is either static or nomadic only, and sharing of resources is allowed. Otherwise, the access type characteristic may include only cellular access. By way of another example, when the class of subscriber or the service category may be bronze, and the service request may be pre-emptible then an unlicensed spectrum access may be included as a possible radio access. By way of yet another example, when the class of subscriber and/or service category may be platinum (i.e., highest), and performance of Wi-Fi access shows a deteriorating trend then the RES-BUD-SS 214 may not include Wi-Fi in the access type characteristic even when all other conditions for including it may be satisfied.

Moreover, when the class of subscriber or service category may be platinum (highest), the service priority may be high, or if the service request may correspond to an emergency service, or if security requirements may be high, then dedicated physical resources may be indicated in the SLICE-SUB-CHAR for all subnet types. In addition, when the service request may correspond to an emergency service, or when reliability and availability levels may be high, or when weather/radio conditions may be poor, then the backhaul option in the SLICE-SUB-CHAR may be only optical fiber, otherwise it may also include Wireless. It should be noted in the examples listed above, the value of some of the attributes in SLICE-SUB-CHAR may not be derived but may be automatically determined at time of determination of an appropriate slice subnet instance based on other SLICE-SUB-CHAR and the slice sub-net's performance requirements. As will be appreciated, in case of large heterogenous network deployments, the determination of the appropriate slice subnet instances may become cumbersome. However, an existing mechanism for determining the appropriate slice sub-net instances may not converge at all within a reasonable time, thereby causing the service request to be refused or fulfilled too late. Moreover, the RES-BUD-SS 214 may take over some characteristics to the SLICE-SUB-CHAR for relevant subnets that may be directly captured from the UPD-SRV-CHAR (e.g., pre-emption, mobility level).

At step 606, a set of associated performance requirement attributes may be determined corresponding to each of the plurality of network sub-nets in the updated service requirement set. In an embodiment, the set of associated performance requirement attributes may be updated based on a dynamic capability associated with each of the plurality of network sub-nets, the adapted performance requirements in the service requirement set, and cost. The set of associated performance requirement attributes that needs to be updated may be represented as a set of UPD-PERF-REQ-ATTR. In order to determine the appropriate values for each UPD-PERF-REQ-ATTR, the RES-BUD-SS 214 may check the dynamic capabilities of each of the plurality of network sub-nets for that UPD-PERF-REQ-ATTR. Moreover, the dynamic capabilities of all applicable segment types of each of the plurality of network sub-nets may be considered. Examples of the applicable segment types may include, but is not limited to, Wi-Fi, Cellular access for RAN; optical fiber and wireless backhaul for transport; fiber, and enhanced common public radio interface (eCPRI) fronthaul for transport which is part of the RAN. In an embodiment, the dynamic capabilities may be predicted by the AN-COF-SS 216 based on data collected (i.e., network configuration, fault and performance) by the SL-SRV-MON-SS 212 periodically. In addition, the dynamic capabilities may be predicted by the AN-COF-SS 216 based on notifications received from domain controllers/orchestrators (i.e., based on current network context). Moreover, the dynamic capabilities may be in form of range of values, and any limitations in supporting for example, a certain access type. In some cases, the dynamic capabilities may be obtained by the SL-SRV-MON-SS 212 based on querying the respective domain controller/orchestrator. Further, the SL-SRV-MON-SS 212 may then provide the dynamic capabilities determined to the RES-BUD-SS 214.

Thereafter, a set of relevant candidate values may be generated for the UPD-PERF-REQ-ATTR for each of the plurality of network sub-nets. The set of relevant candidate values may be generated based on constraints imposed by the dynamic capabilities (also referred as network segment capability) and specified values in the updated service requirement set. By way of an example, in case of latency attribute, if the dynamic capability of a particular sub-net (e.g., a core sub-net) from the plurality of network sub-nets, indicates minimum latency of 5 milliseconds (ms). In addition, the updated service requirement set specifies maximum latency to be 15 ms. Then candidate values for latency attributed of the core sub-net may be generated in milliseconds, starting from 5 ms up to 15 ms.

It should be noted that, granularity of generating the candidate values may be provisioned per attribute type. Moreover, the candidate value may also depend on value specified in the updated service requirement set. By way of an example, the candidate value for throughput may be generated in steps of 500 Kbps. However, the candidate value may be generated in lower steps, say, in steps of 100 Kbps, if the updated service requirement set specifies a throughput value of 2.6 Mbps. This mechanism is applied to ensure that neither too many candidates nor too few candidates may be generated. Moreover, the granularity may also be auto adjusted based on monitoring of performance of the each of the plurality of network sub-nets.

Thereafter, the candidate values for the UPD-PERF-REQ-ATTR for each of the plurality of network subnets may be determined by combining the candidate values of the UPD-PERF-REQ-ATTR of all applicable sub-nets suitably (using weights, or more complex rules). Moreover, the candidate values of all applicable sub-nets may be in a way such that they fulfill the value in the updated service requirement set subjected to optimum cost (also referred as cost), in proportion to the plurality of user entitlements. In an embodiment, the weights may be determined based on historical (actual) performance of the slice sub-net instance within that sub-net (e.g., RAN) when the specific candidate value of the UPD-PERF-REQ-ATTR was chosen. By way of an example, a value of 5 ms may be chosen for latency of a RAN slice sub-net. However, an actual performance of the RAN for the slice sub-net instance may be more than 5 milliseconds for more than 10% of time on average. Therefore, the weight determined may be 1.1.

Thereafter, the cost may be computed as sum of the costs of supporting a specific value of the UPD-PERF-REQ-ATTR in each of the plurality of network sub-nets. For example, a lower latency value in the RAN could have a higher cost. Therefore, in order to support a latency value of, say, 20 ms as specified in the updated service requirement set, a latency split of 5 ms-10 ms-5 ms in RAN-Core-Transport sub-nets respectively may be performed. The latency split may result in a cost of 'x', while a split of 6 ms-9 ms-5 ms in RAN-Core-Transport sub-nets respectively may result in a cost of 'y' (i.e., different from 'x'). In an embodiment, the weights and the costs may be based on provisioned rules. The provisioned rules may then be auto adapted based on performance and fault monitoring of the network slice instance, the slice sub-net instances and the service(s) request being catered to. Moreover, the cost may also be dynamically adjusted based on occupancy levels of resources that may be essential for supporting a specific value (or better) of attribute characteristic dimension (i.e., ATT-CHAR-DIM) in that sub-net. In addition, the cost for same value of attribute in different sub-nets types of the same subnet (e.g., Wi-Fi vs cellular) may be different. Also, the cost for same value of attribute may be adjusted based on the plurality of user entitlements.

Thereafter, all solutions (i.e., the values for all sub-nets) of the specific UPD-PERF-REQ-ATTR may be stored in an updated performance requirement attribute list (i.e., UPD-PERF-REQ-ATTR-LIST) based on an ascending order of the cost. The UPD-PERF-REQ-ATTR-LIST may be a part of an updated performance requirement attribute table (i.e., UPD-PERF-REQ-ATTR-TABLE). The UPD-PERF-REQ-ATTR-TABLE may store attribute names along with the UPD-PERF-REQ-ATTR-LIST. The UPD-PERF-REQ-ATTR-LIST may store solutions (sets of values) corresponding to the attribute. By way of an example, an attribute name 'latency' may store value in the UPD-PERF-REQ-ATTR-LIST as '(5, 10, 5), (6, 8, 7)', wherein 5, 10 and 5 may correspond to the latency values for RAN, Transport and Core sub-nets; similarly 6, 8 and 7 may correspond to the latency values for RAN, Transport and Core sub-nets. By way of another example, an attribute name 'availability' may store value in the UPD-PERF-REQ-ATTR-LIST as '(99, 98, 99), (99.9, 97, 99)', wherein 99, 98 and 99 may correspond to the availability values for RAN, Transport and Core sub-nets; similarly 99.9, 97 and 99 may correspond to the availability values for RAN, Transport and Core sub-nets.

Thereafter, at step 608, resource budget may be determined corresponding to each of the plurality of network sub-nets. Each of the plurality of network sub-nets may correspond to a network sub-net in which a slice sub-net instance may be required to be selected to create the new network slice instance. In an embodiment, the resource budget comprises of the set of associated characteristic attributes and the set of associated performance requirement attributes. Once the UPD-PERF-REQ-ATTR-LIST may be determined for all applicable UPD-PERF-REQ-ATTR, the RES-BUD-SS 214 may then select first 'n' solutions for each UPD-PERF-REQ-ATTR in the UPD-PERF-REQ-ATTR-TABLE. Thereafter, the RES-BUD-SS 214 may form a resource budget performance requirement solution list (i.e., RES-BUD-PERF-REQ-SOLN-LIST) by forming combinations of the different solutions of each UPD-PERF-REQ-ATTR. It should be noted that, the value of 'n' may be proportionate to the plurality of user entitlements. In addition, the value of 'n' may be provisioned initially but later adapted based on actual performance of the slice sub-nets instance and the compliance levels of the network slice sub-nets instance to performance requirements as specified by the updated service requirement set. Moreover, a resultant solution combinations may correspond to '$({}^nC_1)^{UPD\text{-}PERF\text{-}REQ\text{-}ATTR}$'. By way of an example, the value 'n=2' may correspond to a normal class of subscriber and a normal service priority. For example, there may be four UPD-PERF-REQ-ATTR. In addition, each of the four UPD-PERF-REQ-ATTR may have at least 3 candidate values in the UPD-PERF-REQ-ATTR-LIST. Therefore, when n=2 in such a scenario, the resultant solution combinations may correspond to '$({}^2C_1)^{(4)}=16$'.

Thereafter, each solution in the RES-BUD-PERF-REQ-SOLN-LIST may be ranked based on availability of resources and/or capacity of various subnets in the plurality of network sub-nets that may correspond to the various UPD-PERF-REQ-ATTR. It should be noted that, the solution in the RES-BUD-PERF-REQ-SOLN-LIST may be ranked based on provisioned rules. By way of an example, a solution that may have lower latency for transport sub-net may be less preferred when resource occupancy level in the sub-net may be greater than a resource occupancy sub-net threshold (i.e., RES-OCCUP-SN-THR). The resource/capacity check may also involve checking in specific geographical area(s) where the service may be requested. In such cases, a higher allowance for the UPD-PERF-REQ-ATTR may provide more choices for selecting the appropriate slice sub-net(s) to the NTW-ST-CONF-SS 212 and the NTW-SL-ORCH-SS 210.

Thereafter, depending on whether the updated service requirement set indicates if resource sharing may be allowed or not, a set of actions may be performed. When the updated service requirement set indicates resource sharing may be allowed, the set of actions may be performed when network policy may indicate a preference for reusing the existing slice subnet instances over creating the new slice sub-net instances, or when number of slice subnet instances may be greater than number slice sub-net instance threshold (i.e., NBR-SLICE-SUB-INST-THR)

When the updated service requirement set indicates resource sharing may be allowed (this means, an existing slice sub-net instance may be reused when found to be appropriate), a first action may be to fetch a list of active slice sub-net instances per sub-net. The list of active slice sub-net instances fetched may have same template hierarchy that may have been determined currently for the updated service requirement set. Thereafter, list of active slice sub-net instances may be updated in slice sub-net instance table (i.e., SLICE-SUB-NET-INST-TABLE). The SLICE-SUB-NET-INST-TABLE may be stored in the SL-SRV-RES-INV 218.

Further, all slice subnet instances whose resource occupancy levels may be determined to be greater than a resource occupancy slice sub-net instance lower threshold (i.e., RES-OCCUP-SLSI-LOW-THR) may be removed from the SLICE-SUB-NET-INST-TABLE. Moreover, if a match may be identified for any solution in_RES-BUD-PERF-REQ-SOLN-LIST and a sub-net performance requirement (i.e., SUBNET-PERF-REQ) supported by a slice subnet instance in SLICE-SUB-NET-INST-TABLE, then a rank of that solution may be increased by a factor, say, 'k. In an embodiment, the factor 'k' may be proportionate to cumulative match score (i.e., CUM-MAT-SC). In addition, the match between the solution in the RES-BUD-PERF-REQ-SOLN-LIST for that sub-net and the SUBNET-PERF-REQ for a particular slice subnet instance may be determined by comparing each of the UPD-PERF-REQ-ATTR value (for that sub-net) and the value of corresponding attribute in the SUBNET-PERF-REQ. Once the match may be determined then a match score may be assigned per UPD-PERF-REQ-ATTR. Thereafter, the CUM-MAT-SC may be computed. In an embodiment, the CUM-MAT-SC may be a simple or weighted average of the match score per UPD-PERF-REQ-ATTR. Moreover, when the CUM-MAT-SC may be more than a match score threshold (i.e., MAT-SC-THR), then the solution may be considered as matching. Once the matching may be identified then the rank of the solution may be adjusted in the RES-BUD-PERF-REQ-SOLN-LIST. When the updated service requirement set indicates resource sharing may not be allowed, no actions may be taken.

In an embodiment, the RES-BUD-SS 214 may then make suitable updates to entries in the RES-BUD-PERF-REQ-SOLN-LIST based on historical performance and current network context. By way of an example, if a particular combination of attributes (e.g., latency) was found to be problematic historically when the resource occupancy levels were greater than a certain threshold, or when certain services were active, then the corresponding solution may be removed, or lowered in rank in the RES-BUD-PERF-REQ-SOLN-LIST. Further, the RES-BUD-SS 214 may then augment each remaining entry in the RES-BUD-PERF-REQ-SOLN-LIST with the attributes that may be simply taken over from the updated performance requirement (i.e., UPD-PERF-REQ) in the updated service requirement set (for e.g., user density). Thereafter, the RES-BUD-SS 214 may provide the determined slice subnet characteristics and the associated resource budgets, i.e., SLICE-SUB-CHAR for all applicable subnets, and the RES-BUD-PERF-REQ-SOLN-LIST (that may contain the resource budgets for each of the plurality of network sub-nets) to the NTW-ST-CONF-SS 208.

At step 610, an appropriate network slice shell hierarchy including a slice sub-net hierarchy may be determined based on the network slice template hierarchy, the set of associated characteristics attributes, the set of associated performance attributes, and the resource budgets. In order to determine the appropriate network slice shell hierarchy including a slice sub-net hierarchy, the NTW-ST-CONF-SS 208 may take first solution in the RES-BUD-PERF-REQ-SOLN-LIST. Further, the NTW-ST-CONF-SS 208 may extract the resource requirements and performance requirements for each of the plurality of network sub-nets. Thereafter, the NTW-ST-CONF-SS 208 may store the resource requirements and performance requirements in resource performance requirement slice sub-net (i.e., RES-PERF-REQ-SLICE-SUBNET) for that subnet. In an embodiment, the extraction of the resource requirements and performance requirements may comprise the RES-REQ-SLICE-SUB-NET for physical and logical resource budgets and performance requirement slice sub-net (i.e., PERF-REQ-SLICE-SUBNET) for performance budgets/requirements.

Thereafter, the NTW-ST-CONF-SS 208 may determine the appropriate network slice shell hierarchy including the slice sub-net hierarchy based on the template hierarchy determined by the template Controller 140, the SLICE-SUB-CHAR, and the RES-PERF-REQ-SLICE-SUBNET. In order to determine the appropriate network slice shell hierarchy, the reuse of the existing network slice sub-net instance or the creation of the new network slice sub-net instance may be determined. It should be noted that, in order to determine a feasibility of scaling of appropriate resources in the existing network slice subnet instance to meet the resource and/or performance requirements as specified in the RES-PERF-REQ-SLICE-SUBNET, the priority and preemption attributes in the SLICE-SUB-CHAR, and the plurality of user entitlements may be taken into consideration. By way of an example, consider a service request with high priority and/or a user with high entitlement (e.g., a Platinum class user). Now suppose that sufficient resources may not be available corresponding to a network slice subnet instance that may otherwise be found suitable for reuse. However, services of lower priority that may be pre-empted may be catered by that network slice subnet instance (or by another N-S subnet instance) which make use of same resources. Hence, it may be assumed that the sufficient resources may be available for the new service request, and the network slice subnet instance may be selected for reuse.

In an embodiment, when a suitable network slice shell hierarchy may not be determined by the NTW-ST-CONF-SS 208 using the first solution in the RES-BUD-PERF-REQ-SOLN-LIST, then the NTW-ST-CONF-SS 208 may consider next solution in the RES-BUD-PERF-REQ-SOLN-LIST. Further, as done for the first solution in the RES-BUD-PERF-REQ-SOLN-LIST (described above), the NTW-ST-CONF-SS 208 may extract the resource requirements and performance requirements for each of the plurality of network sub-net. The NTW-ST-CONF-SS 208 may store the resource requirements and performance requirements in the RES-PERF-REQ-SLICE-SUBNET for that subnet. Thereafter, the NTW-ST-CONF-SS 208 may determine the appropriated network slice shell hierarchy including the slice sub-net hierarchy. In an embodiment, a process of determining the appropriated network slice shell hierarchy including the slice sub-net hierarchy may continue until a suitable network slice shell hierarchy may be found using a solution in RES-BUD-PERF-REQ-SOLN-LIST or all solutions in the RES-BUD-PERF-REQ-SOLN-LIST have been considered.

Figure 7:
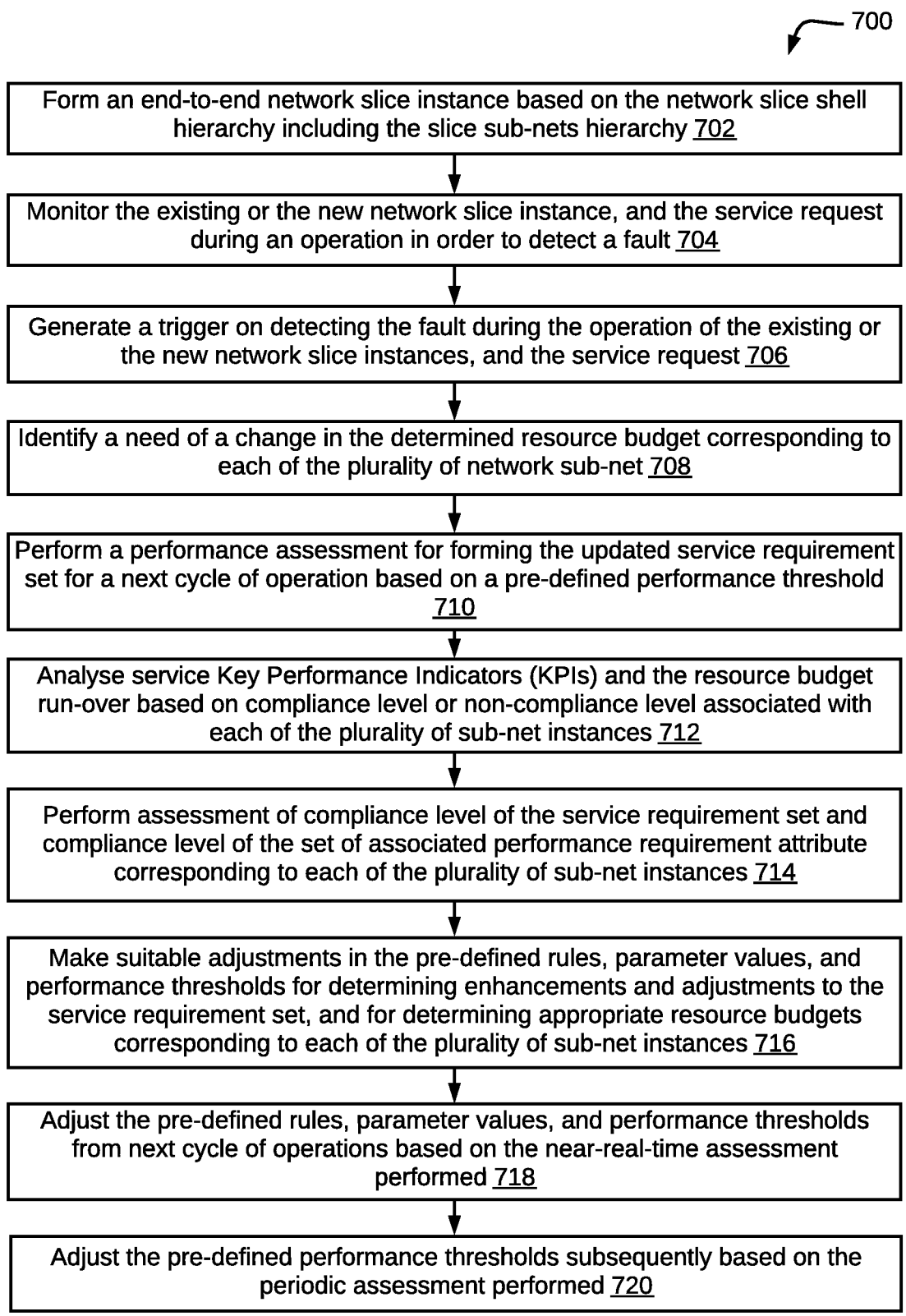
FIG. 7 illustrates a flowchart of a method for performing a performance assistance in order to form an updated service requirement set on detecting a fault, in accordance with an embodiment.

Referring now to FIG. 7, a flowchart of a method for performing a performance assistance in order to form the updated service requirement set on detecting a fault is illustrated, in accordance with an embodiment. At step 702, an end-to-end network slice instance may be formed based on the network slice shell hierarchy including the slice sub-nets hierarchy. In an embodiment, the end-to-end network slice instance may be formed when the suitable network slice shell hierarchy may have been determined by the NTW-ST-CONF-SS 208, then the NTW-ST-CONF-SS 208 may create/modify/reuse the network slice instance as appropriate. The allocating or scaling resources for the network slice instance or the network slice sub-net instance may be done the RES-ORCH-SS 204 based on the priority and pre-emption attribute. By way of an example, a user with higher entitlement may get a "costlier" (but better) resource. In addition, some resources that may be allocated to another existing network slice sub-net instance may be pre-empted in order to fulfill needs of the user with higher entitlement.

At step 704, the existing or the new network slice instance, and the service that was requested (and catered to by the network slice instance) may be monitored during an operation in order to detect or predict a fault and/or performance issue. In an embodiment, the NTW-SL-ORCH-SS 206 and the NTW-SERV-ORCH-SS 210 may trigger the SL-SERV-MON-SS 212 in order to activate monitoring for the slices, sub-nets and the service. At step 706, a trigger may be generated on detecting/predicting a fault or performance issue during the operation of the existing or the new network slice instance, and the service request. In an embodiment, the SL-SERV-MON-SS 212 or the AN-COF-SS 216 may trigger the NTW-SL-ORCH-SS 206 on detecting/predicting the fault/performance during operation of the network slice or service.

At step 708, a need of a change may be identified in the determined resource budget corresponding to each of the plurality of network sub-net. In an embodiment, the NTW-SL-ORCH-SS 206 may then trigger the RES-BUD-SS 214 via the NTW-ST-CONF-SS 208 in order to determine whether any change may be needed in the resource budget. The RES-BUD-SS 214 may ascertain a need of any change in the entry of the RES-BUD-PERF-REQ-SOLN-LIST that that may have been chosen by the NTW-ST-CONF-SS 208. The need of change may be ascertained by taking into consideration the dynamic network context, and extent of change that may be relevant to the current network slice. By way of an example, changes (e.g., >20%) in the resource occupancy levels of one or network slice subnets may be serving the network slice/service under consideration, one or more network slices that the network slice sub-net may be a part may have a high load. Moreover, in case of changes beyond provisioned thresholds, the RES-BUD-SS 214 may re-determine the ranks (and suitability) of all the solutions in the RES-BUD-PERF-REQ-SOLN-LIST. Thereafter, the RES-BUD-SS 214 may provide the updated RES-BUD-PERF-REQ-SOLN-LIST back to the NTW-ST-CONF-SS 208.

The NTW-ST-CONF-SS 208 may then determine whether to perform necessary scaling in order to fulfill the updated RES-PERF-REQ-SLICE-SUBNET for the impacted network slice sub-net instance. In addition, the NTW-ST-CONF-SS 208 may determine whether to choose a new solution entry in the RES-BUD-PERF-REQ-SOLN-LIST. Thereafter, the NTW-ST-CONF-SS 208 may then re-determine the network slice shell hierarchy. In an embodiment, the choice to perform necessary scaling may depend on extent of scaling required (also referred to as the cost), the plurality of user entitlements, and the dynamic network context (to determine if scaling is feasible). In another embodiment, the choice to choose the new solution entry may be based on the rank of the solution entry in the RES-BUD-PERF-REQ-SOLN-LIST. Moreover, the new solution entry may be chosen, when the rank of the solution chosen may have decreased by more than 'm' places (where 'm' may represent a provisioned limit), and no feasibility to scale resources. In addition, if the choice to choose the new solution entry may be selected, then the NTW-ST-CONF-SS 208 may opt for a solution that may require minimum adaptation to the existing network slice shell hierarchy and/or the one with optimum cost. The NTW-ST-CONF-SS 208 may opt for a solution that may require minimum adaptation based on the plurality of user entitlement (for cost) and the dynamic network context (for technical feasibility).

At step 710, a performance assessment may be performed for forming the updated service requirement set for a next cycle of operation based on a pre-defined performance threshold. Moreover, the NTW-SL-ORCH-SS 206 may ascertain if any changes may be required in the updated service requirement set due to at least one change in the plurality of user entitlement. Example of the change in the plurality of user entitlement may include, but is not limited to, user is approaching limit-of-credit, priority of the service has been increased (e.g., by regulatory authorities), user has exhausted the guaranteed entitlement as a premium user, and degradation of user to a normal user. Thereafter, based on changes made in the updated service requirement set, appropriate resolution actions may be performed by the NTW-SL-ORCH-SS 206 with the help of NTW-ST-CONF-SS 208 and the RES-BUD-SS 210. The appropriate resolution actions may include scaling, and re-mapping service to a different slice (i.e., re-determining the N-S shell hierarchy).

At step 712, service Key Performance Indicators (KPIs) and the resource budget over-run may be analyzed based on compliance level or non-compliance level associated with each of the plurality of sub-net instances. In an embodiment, the analysis may be performed using one of a well-known technique such as linear regression, decision trees, deep learning, or using other proprietary techniques. In an embodiment, the service KPIs non-compliance to the SRV-PERF-REQ (as well as UPD-PERF-REQ) by the network slice instance may be collected by the SL-SRV-MON-SS 212. The NTW-SERV-ORCH-SS 210 and NTW-SL-ORCH-SS 206 may then analyze causes and correlations between performance and lapses in compliance levels. The causes and correlations may be analyzed with help of the AN-COF-SS 216 in order to determine a root cause(s). Thereafter, based on the analysis, the NTW-SL-ORCH-SS 206 may adapt rules and thresholds in order to form the updated service requirement set for the next cycle of operation. The adaptation may also take into consideration the dynamic network context. Examples of adaptation may include adaptation to the rules or parameter values for updating the service dimension. By way of an example, when the service failures/deterioration of quality may happen more at the coverage boundaries, then the coverage area may be expanded in order to much wider. For example, the coverage area may be increase by, say, 10% for a user with normal (average) entitlement, and may progressively increase by higher % for users with higher entitlements (subject to an upper limit of, say, 25%). By way of another example, the adaptation to the pre-emptibility of certain service types of specific user classes (e.g., adaptation to the rules in order to determine if a service is pre-emptible), may be done based on the service quality delivered. For example, the delivered service quality of a higher entitlement user may not be significantly higher than a lower entitlement user, due to resources of the lower entitlement user being non pre-emptible.

Moreover, the RES-BUD-SS 214 may perform analysis of the non-compliance to the performance requirements of the slice subnet instance (i.e., PERF-REQ-SLICE-SUBNET) by the slice subnet instance, and the resource budget overrun. The non-compliance to the performance requirements of the slice subnet instance may be performed based on relevant inputs received from NTW-ST-CONF-SS 208 and assistance received from the AN-COF-SS 216. The analysis of the non-compliance to the performance requirements may include analysis of the non-compliance to the performance requirements of the slice sub-net instance specified for various network slice instances (i.e., network slice shell hierarchies of which the network slice instance may be part of). In addition, the analysis of the non-compliance may include inferring unsuitable values and examining causes. Examples of the causes may include, but is not limited to, resource constraints, traffic patterns i.e., influence of simultaneous user connections or sessions, i.e., activity factor. Moreover, the analysis of the non-compliance to the performance requirements may include analysis of the slice sub-net instance that may be part of the network slice shell hierarchy serving a user with higher user entitlement, due to resource constraints.

It should be noted that, the analysis may be employed based on well-known mechanism. Examples of well-known mechanism may include machine learning techniques, correlation, or other proprietary techniques. Thereafter, based on the analysis and the determined root cause(s), the RES-BUD-SS 214 and the NTW-SL-ORCH-SS 206 may adapt the thresholds for resource budget determination and determination of the updated service requirement set based on the user entitlement respectively. By way of an example, the RES-BUD-SS 214 may adjust activity factor (i.e., number of simultaneous sessions or connections) threshold for selecting Wi-Fi as an access type when Wi-Fi is used. In addition, the RES-BUD-SS 214 may adjust the weight for a particular set of values for the PERF-REQ-ATTR based on activity factor and/or resource occupancy level, and so on. Thereafter, the updated rules, parameter values and threshold may be used in the next cycle of operation, i.e., next time when the updated service requirement set may be determined and/or a next time when the network slice shell hierarchy may be determined.

At step 714, periodic assessment may be performed of compliance level of the service requirement set and compliance level of the set of associated performance requirement attributes for the slice sub-net instances corresponding to each of the plurality of sub-nets. The NTW-SL-ORCH-SS 206 may also initiate the periodic assessment of the service requirement set of compliance levels, as well as compliance to the slice sub-net performance requirements by the various sub-nets. Thereafter, the NTW-SL-ORCH-SS 206 may analyze reasons for non-compliance including assessment of the dynamic network context during time of failure, and fault/performance issues. Moreover, NTW-SL-ORCH-SS 206 may also involve the AN-COF-SS 216 for any trend analysis, and determination of root cause. Moreover, a result of the analysis performed by the NTW-SL-ORCH-SS 206 may determine the updated service requirement set by making suitable adaptation. The suitable adjustments may include adjustments to the plurality of user entitlement based on comparison of delivered service quality to a user with higher user entitlement and a user with lower user entitlement for a similar service under similar network contexts. For example, if there was no significant difference in the delivered service quality, then USER-ENTLMENT-FACTOR value may be increased for higher user entitlement, or the USER-ENTLMENT-FACTOR value may be decreased for lower user entitlement. depending on whether the delivered service quality was consistently greater than a minimum threshold or not.

In addition, adjustments to coverage extension rules may be done based on the plurality of user entitlements, considering also mobility factor. By way of example, for same high user entitlement case, in case of full mobility service, the delivered service quality may be lower than for limited/no mobility service. Therefore, the coverage extension factor may be increased for high mobility case. In addition, after checking behavior over an extended period of time in the past to avoid fluctuations. At step 716, the suitable adjustments may be made in the pre-defined rules, parameter values, and performance thresholds for determining enhancements and adjustments to the service requirement set, and for determining appropriate resource budgets corresponding to each of the plurality of sub-net instances. In an embodiment, the adjustments may be made corresponding to the plurality of user entitlements and assessed compliance level.

At step 718, the pre-defined rules, parameter values, and performance thresholds from next cycle of operations may be adjusted based on the near-real-time assessment performed. At step 720, the pre-defined performance thresholds may be adjusted subsequently based on the periodic assessment performed. In an embodiment, the RES-BUD-SS 214 may make suitable adjustments to thresholds and parameter values in order to determine the resource budgets. By way of an example, in case of a frequent re-determination of resource budgets and/or network slice shell hierarchy for specific user entitlement, then the value of 'n' (the solutions for resource budgets) for those user entitlements may be increased. By way of another example, the cost of a certain "better" attribute value (i.e., value of UPD-PERF-REQ-ATTR) may be increased proportionate to number of times a value may not be supported due to unavailability of resources. In case there was a consequent impact to delivered service quality to a user with higher user entitlement, the cost may be further adjusted to a higher value. The attribute value "better" may mean "lower" in case of attributes such as latency, and "higher" in case of attributes such as throughput.

Above described mechanism may be used to determine the resource budgets for elements in the network slice shell hierarchy may apply even if there may be multiple levels in the hierarchy of subnets. By way of an example, a network slice shell may comprise a RAN subnet, a Transport subnet and a Core subnet. Further, the RAN subnet in turn comprises of a Fronthaul Transport subnet, a Mid-haul Transport subnet and a RAN CU-DU-RU subnet. Thereafter, the core subnet further comprises of edge core subnet (including Core Network Functions to be present at edges of the network), and Central core subnet.

Figure 8:
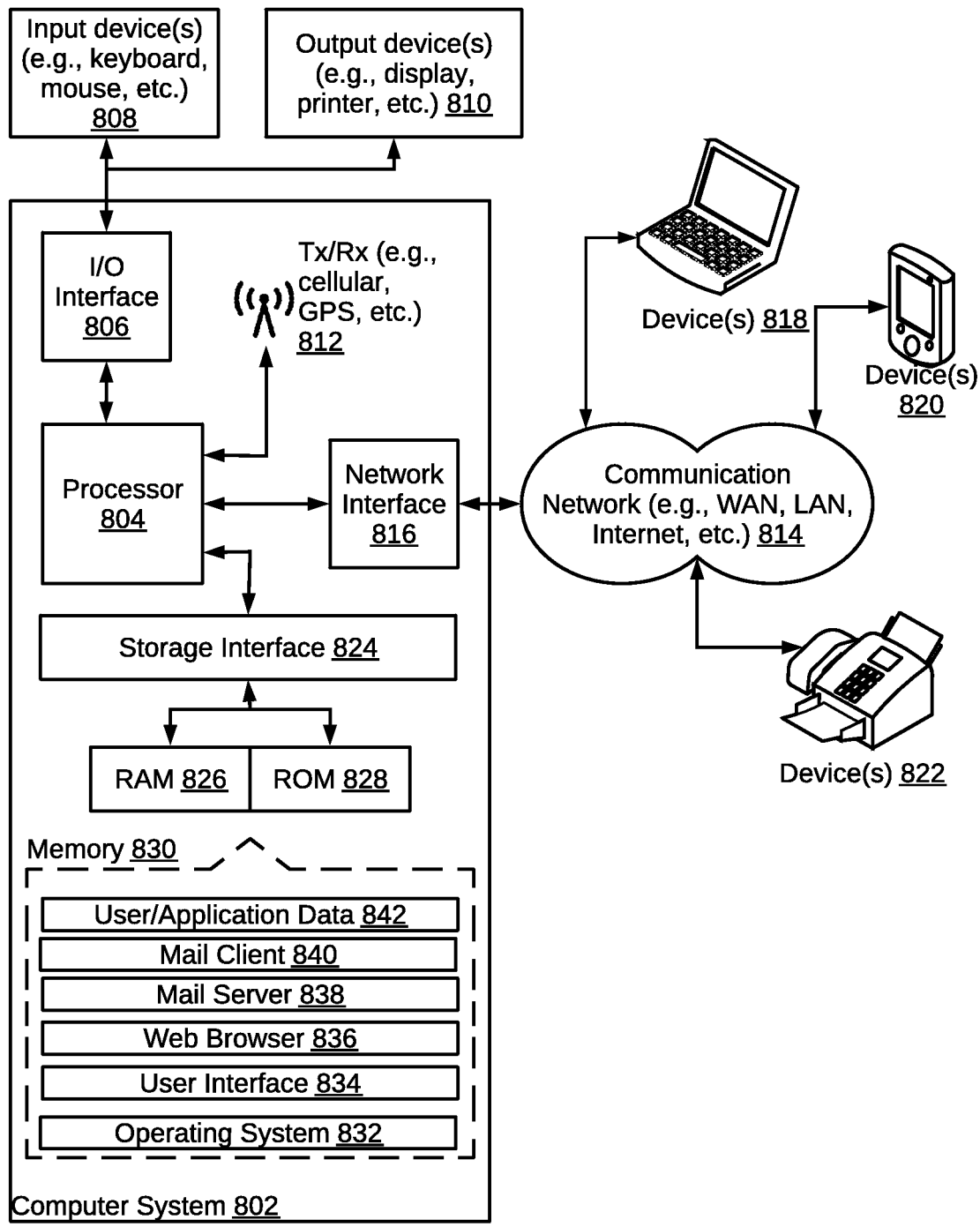
FIG. 8 illustrates a block diagram of an exemplary computer system for implementing embodiments consistent with the present disclosure.

Referring now to FIG. 8, a block diagram of an exemplary computer system 802 for implementing various embodiments is illustrated. Computer system 802 may include a central processing unit ("CPU" or "processor") 804. Processor 804 may include at least one data processor for executing program components for executing user or system-generated requests. A user may include a person, a person using a device such as such as those included in this disclosure, or such a device itself. Processor 804 may include specialized processing units such as integrated system (bus) controllers, memory management control units, floating point units, graphics processing units, digital signal processing units, etc. Processor 804 may include a microprocessor, such as AMD® ATHLOM® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 804 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 804 may be disposed in communication with one or more input/output (I/O) devices via an I/O interface 806. I/O interface 806 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 806, computer system 802 may communicate with one or more I/O devices. For example, an input device 808 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 810 may be a printer, fax machine, video display (for example, cathode ray tube (CRT), liquid crystal display (LCD), light-emitting diode (LED), plasma, or the like), audio speaker, etc. In some embodiments, a transceiver 812 may be disposed in connection with processor 804. Transceiver 812 may facilitate various types of wireless transmission or reception. For example, transceiver 812 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 804 may be disposed in communication with a communication network 814 via a network interface 816. Network interface 816 may communicate with communication network 814. Network interface 816 may employ connection protocols including, without limitation, direct connect, Ethernet (for example, twisted pair 10/100/1000 Base T), transmission control protocol/internet protocol (TCP/IP), token ring, IEEE 802.11a/b/g/n/x, etc. Communication network 814 may include, without limitation, a direct interconnection, local area network (LAN), wide area network (WAN), wireless network (for example, using Wireless Application Protocol), the Internet, etc. Using network interface 816 and communication network 814, computer system 802 may communicate with devices 818, 820, and 822. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® reader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 802 may itself embody one or more of these devices.

In some embodiments, processor 804 may be disposed in communication with one or more memory devices (for example, RAM 826, ROM 828, etc.) via a storage interface 824. Storage interface 824 may connect to memory 830 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 830 may store a collection of program or database components, including, without limitation, an operating system 832, user interface application 834, web browser 836, mail server 838, mail client 840, user/application data 842 (for example, any data variables or data records discussed in this disclosure), etc. Operating system 832 may facilitate resource management and operation of computer system 802. Examples of operating systems 832 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 834 may facilitate display, execution, interaction, manipulation, or operation of program components through textual or graphical facilities. For example, user interfaces may provide computer interaction interface elements on a display system operatively connected to computer system 802, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 802 may implement a web browser 836 stored program component. Web browser 836 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 802 may implement a mail server 838 stored program component. Mail server 838 may be an Internet mail server such as MICROSOFT® EXCHANGE® mail server, or the like. Mail server 838 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 838 may utilize communication protocols such as internet message access protocol (IMAP), messaging application programming interface (MAPI), Microsoft Exchange, post office protocol (POP), simple mail transfer protocol (SMTP), or the like. In some embodiments, computer system 802 may implement a mail client 840 stored program component. Mail client 840 may be a mail viewing application, such as APPLE MAIL® mail-client, MICROSOFT ENTOURAGE® mail client, MICROSOFT OUTLOOK® mail client, MOZILLA THUNDERBIRD® mail client, etc.

In some embodiments, computer system 802 may store user/application data 842, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method and system for adaptive determination of network slice configuration and resource requirement. The method and system may first create a service requirement set based on a service request. The method and system may then determine enhancements and adjustments to be done in the service requirement set based on a plurality of user entitlements corresponding to the user associated with the service request. Further, the method and system may generate an updated service requirement set based on the enhancements and adjustments applied on the service requirement set. Thereafter, the method and system may determine a network slice template hierarchy based on the updated service requirement set, and wherein the network slice template hierarchy comprises a plurality of network sub-nets. Additionally, the method and the system may determine a resource requirement corresponding to each of the plurality of network sub-nets based on the updated service requirement set, the plurality of user entitlements, and dynamic network context.

The specification has described method and system for adaptive determination of network slice configuration and resource requirement The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for adaptive determination of network slice configuration and resource requirement, comprising:
   creating, by a network slice orchestration device, a service requirement set based on a service request, wherein the service requirement set comprises service characteristics, service performance requirements, and service dimensions associated with the service request;
   determining, by the network slice orchestration device, adaptations to the service characteristics based on a priority attribute and a pre-emptibility attribute, wherein the priority attribute is determined based on a weighted average of a class of subscriber and a service priority, and wherein the pre-emptibility attribute is determined based on an allowance of other services to pre-empt the service request, and a capability associated with the service request to pre-empt other services;

determining, by the network slice orchestration device, the adaptations to the service performance requirements in proportion to a plurality of user entitlements, based on a plurality of relevant attributes extracted from the service performance requirements, wherein the plurality of relevant attributes comprises reliability and availability, and wherein the plurality of user entitlements comprises a class of subscriber, a service category, maximum usage limit, and a service priority;

determining, by the network slice orchestration device, the adaptations to the service dimensions based on a historical data, wherein the historical data includes information about a service loss, a service deterioration, and a service quality deterioration in proportion to the plurality of user entitlements;

determining, by the network slice orchestration device, enhancements and adjustments to be done in the service requirement set based on the adaptations to the service characteristics, the adaptations to the service performance requirements and the adaptation to the service dimensions;

generating, by the network slice orchestration device, an updated service requirement set based on the enhancements and adjustments applied on the service requirement set;

determining, by the network slice orchestration device, a network slice template hierarchy based on the updated service requirement set, and wherein the network slice template hierarchy comprises a plurality of network sub-nets; and determining, by the network slice orchestration device, a resource requirement corresponding to each of the plurality of network sub-nets based on the updated service requirement set, the plurality of user entitlements, and dynamic network context, wherein the method further comprises:

forming an end-to-end network slice instance based on the network slice shell hierarchy including the slice sub-nets hierarchy;

monitoring the existing or the new network slice instance, and the service request during an operation in order to detect a fault; and performing a performance assessment for forming the updated service requirement set for a next cycle of operation based on a pre-defined performance threshold, wherein allocating the resource for each of the plurality of network sub-nets corresponding to network slice instance comprises:

performing a check in order to determine at least one of a reuse of an existing network slice instance or a creation of a new network slice instance; and determining resource budget corresponding to each of the plurality of network sub-nets in which a slice sub-net instance is required to be selected to create the new network slice instance.

2. The method of claim 1, further comprising receiving the service request and the plurality of user entitlements from at least one of a network operator or a network slice consumer, wherein the service request is associated with one of a creation, a reuse and a modification of at least one of a plurality of network slice instances.

3. The method of claim 1, wherein the allowance and the capability associated with the service request is determined based on a type of service associated with the service request, the service priority, the class of subscriber, and network policy.

4. The method of claim 1, wherein determining the resource budgets corresponding to each of the plurality of network sub-nets comprises:

determining a set of associated characteristic attributes corresponding to each of the plurality of network sub-nets in the updated service requirement set, and wherein the set of associated characteristic attributes is determined based on the dynamic network context, and a type, characteristics, and constraints associated with each of the plurality of network sub-nets; and determining a set of associated performance requirement attributes corresponding to each of the plurality of network sub-nets in the updated service requirement set, and wherein the set of associated performance requirement attributes is updated based on dynamic capabilities associated with each of the plurality of network sub-nets, the adapted performance requirements in the service requirement set, and cost.

5. The method of claim 4, wherein the set of associated characteristic attributes includes access type, and mobility type, and wherein the set of associated performance requirement attributes comprise latency, and throughput, and wherein the type of each of the plurality of sub-net instances includes cellular, Wi-Fi, unlicensed access for Radio Access Network (RAN) sub-net, dedicated physical or logical resources for core and transport sub-net instances, shared physical or logical resources for core and transport sub-net instances, fronthaul and backhaul types for transport sub-net instances.

6. The method of claim 1, further comprising determining an appropriate network slice shell hierarchy including a slice sub-net hierarchy based on the network slice template hierarchy, the set of associated characteristics attributes, the set of associated performance attributes, and the resource budget.

7. The method of claim 1, wherein monitoring the network slice instance comprises:

generating a trigger on detecting the fault during the operation of the existing or the new network slice instances, and the service request; and identifying a need of a change in the determined resource budget corresponding to each of the plurality of network sub-net.

8. The method of claim 1, wherein the performance assessment comprises:

analysing service Key Performance Indicators (KPIs) and the resource budget run-over based on compliance level or non-compliance level associated with each of the plurality of sub-net instances;

performing assessment of compliance level of the service requirement set and compliance level of the set of associated performance requirement attribute corresponding to each of the plurality of sub-net instances, wherein assessment comprises a near-real-time assessment and a periodic assessment; and making suitable adjustments in the pre-defined rules, parameter values and performance thresholds for determining enhancements and adjustments to the service requirement set, and for determining appropriate resource budgets corresponding to each of the plurality of sub-net instances, wherein the adjustments is made corresponding to the plurality of user entitlements and the assessed compliance level.

9. The method of claim 8, wherein making the suitable adjustment further comprises:

adjusting the pre-defined rules, parameter values and performance thresholds from next cycle of operations based on the near-real-time assessment performed; and adjusting the pre-defined performance thresholds subsequently based on the periodic assessment performed.

10. The method of claim 1, wherein dynamic network context includes active network slice sub-net instances, network slice instances, active services, resource occupancy levels and congestion levels in each of the plurality of sub-net instances, and a capability of each of the plurality of sub-net instances at that point of time.

11. The system of claim 1, wherein the set of associated characteristic attributes includes access type, and mobility type, and wherein the set of associated performance requirement attributes comprise latency, and throughput, and wherein the type of each of the plurality of sub-net instances includes cellular, Wi-Fi, unlicensed access for Radio Access Network (RAN) sub-net, dedicated physical or logical resources for core and transport sub-net instances, shared physical or logical resources for core and transport sub-net instances, fronthaul and backhaul types for transport sub-net instances.

12. A system for adaptive determination of network slice configuration and resource requirement, the system comprising:

a processor; and a memory communicatively coupled to the processor, wherein the memory stores processor instructions, which, on execution, cause the processor to:

create a service requirement set based on a service request, wherein the service requirement set comprises service characteristics, service performance requirements, and service dimensions associated with the service request;

determine adaptations to the service characteristics based on a priority attribute and a pre-emptibility attribute, wherein the priority attribute is determined based on a weighted average of a class of subscriber and a service priority, and wherein the pre-emptibility attribute is determined based on an allowance of other services to pre-empt the service request, and a capability associated with the service request to pre-empt other services;

determine the adaptations to the service performance requirements in proportion to a plurality of user entitlements based on a plurality of relevant attributes extracted from the service performance requirements, wherein the plurality of relevant attributes comprises reliability and availability, and wherein the plurality of user entitlements comprises a class of subscriber, a service category, maximum usage limit, and a service priority;

determine the adaptations to the service dimensions based on a historical data, wherein the historical data includes information about a service loss, a service deterioration, and a service quality deterioration in proportion to the plurality of user entitlements;

determine enhancements and adjustments to be done in the service requirement set based on the adaptations to the service characteristics, the adaptations to the service performance requirements and the adaptation to the service dimensions;

generate an updated service requirement set based on the enhancements and adjustments applied on the service requirement set;

determine a network slice template hierarchy based on the updated service requirement set, and wherein the network slice template hierarchy comprises a plurality of network sub-nets; and determine a resource requirement corresponding to each of the plurality of network sub-nets based on the updated service requirement set, the plurality of user entitlements, and dynamic network context, wherein the processor instructions further cause the processor to:

form an end-to-end network slice instance based on the network slice shell hierarchy including the slice sub-nets hierarchy;

monitor the existing or the new network slice instance, and the service request during an operation in order to detect a fault; and perform a performance assessment for forming the updated service requirement set for a next cycle of operation based on a pre-defined performance threshold, wherein processor instructions to allocate the resource for each of the plurality of network sub-nets corresponding to network slice instance cause the processor to:

perform a check in order to determine at least one of a reuse of an existing network slice instance or a creation of a new network slice instance; and determine resource budget corresponding to each of the plurality of network sub-nets in which a slice sub-net instance is required to be selected to create the new network slice instance.

13. The system of claim 12, wherein the processor instructions further cause the processor to receive the service request and the plurality of user entitlements from at least one of a network operator or a network slice consumer, wherein the service request is associated with one of a creation, a reuse and a modification of at least one of a plurality of network slice instances.

14. The system of claim 12, wherein the processor instructions to determine the resource budgets corresponding to each of the plurality of network sub-nets further cause the processor to:

determine a set of associated characteristic attributes corresponding to each of the plurality of network sub-nets in the updated service requirement set, and wherein the set of associated characteristic attributes is determined based on the dynamic network context, and a type, characteristics, and constraints associated with each of the plurality of network sub-nets; and determine a set of associated performance requirement attributes corresponding to each of the plurality of network sub-nets in the updated service requirement set, and wherein the set of associated performance requirement attributes is updated based on dynamic capabilities associated with each of the plurality of network sub-nets, the adapted performance requirements in the service requirement set and cost.

15. A non-transitory computer-readable storage medium for adaptive determination of network slice configuration and resource requirement, having stored thereon, a set of computer-executable instructions causing a computer comprising one or more processors to perform steps comprising:

creating a service requirement set based on a service request, wherein the service requirement set comprises service characteristics, service performance requirements, and service dimensions associated with the service request;

determining adaptations to the service characteristics based on a priority attribute and a pre-emptibility attribute, wherein the priority attribute is determined based on a weighted average of a class of subscriber and a service priority, and wherein the pre-emptibility attribute is determined based on an allowance of other services to pre-empt the service request, and a capability associated with the service request to pre-empt other services;

determining the adaptations to the service performance requirements in proportion to a plurality of user entitlements, based on a plurality of relevant attributes extracted from the service performance requirements, wherein the plurality of relevant attributes comprises reliability and availability, and wherein the plurality of user entitlements comprises a class of subscriber, a service category, maximum usage limit, and a service priority;

determining the adaptations to the service dimensions based on a historical data, wherein the historical data includes information about a service loss, a service deterioration, and a service quality deterioration in proportion to the plurality of user entitlements;

determining enhancements and adjustments to be done in the service requirement set based on the adaptations to the service characteristics, the adaptations to the service performance requirements and the adaptation to the service dimensions;

generating an updated service requirement set based on the enhancements and adjustments applied on the service requirement set;

determining a network slice template hierarchy based on the updated service requirement set, and wherein the network slice template hierarchy comprises a plurality of network sub-nets; and determining a resource requirement corresponding to each of the plurality of network sub-nets based on the updated service requirement set, the plurality of user entitlements, and dynamic network context, wherein the steps further comprise:

forming an end-to-end network slice instance based on the network slice shell hierarchy including the slice sub-nets hierarchy;

monitoring the existing or the new network slice instance, and the service request during an operation in order to detect a fault; and performing a performance assessment for forming the updated service requirement set for a next cycle of operation based on a pre-defined performance threshold, wherein allocating the resource for each of the plurality of network sub-nets corresponding to network slice instance comprises:

performing a check in order to determine at least one of a reuse of an existing network slice instance or a creation of a new network slice instance; and determining resource budget corresponding to each of the plurality of network sub-nets in which a slice sub-net instance is required to be selected to create the new network slice instance.

\* \* \* \* \*